United States Patent [19]

Schockman et al.

[11] Patent Number: 4,475,278

[45] Date of Patent: Oct. 9, 1984

[54] METHOD OF ASSEMBLING A MECHANICAL PRESS HAVING A DROP IN DRIVE ASSEMBLY

[75] Inventors: Robert L. Schockman, St. Henry; Vernon E. Busse, Minster; Terry L. Wissman, New Bremen; Daniel A. Schoch, Minster, all of Ohio

[73] Assignee: The Minster Machine Company, Minster, Ohio

[21] Appl. No.: 464,643

[22] Filed: Feb. 7, 1983

Related U.S. Application Data

[62] Division of Ser. No. 299,828, Sep. 8, 1981, Pat. No. 4,397,232.

[51] Int. Cl.$^3$ .............................................. B23P 11/00

[52] U.S. Cl. ........................................ 29/434; 29/469; 72/455

[58] Field of Search .................... 29/434, 469; 72/455; 100/214, 282, 292

[56] References Cited

U.S. PATENT DOCUMENTS

| | | | |
|---|---|---|---|
| 2,185,096 | 12/1939 | Treer | 100/282 X |
| 2,292,827 | 8/1942 | Ernst | 100/214 X |
| 2,745,338 | 5/1956 | Wissman | 100/214 X |
| 2,890,648 | 6/1959 | Martindell | 100/282 X |
| 3,662,640 | 5/1972 | Wrona | 100/272 |
| 3,808,912 | 5/1974 | Voorhees | 100/282 X |
| 3,858,432 | 1/1975 | Voorhees | 72/455 |
| 4,024,807 | 5/1977 | Karsen | 100/292 X |
| 4,095,522 | 6/1978 | Drungil | 100/282 X |
| 4,095,523 | 6/1978 | Drungil | 100/282 X |

*Primary Examiner*—Charlie T. Moon
*Assistant Examiner*—Ronald S. Wallace
*Attorney, Agent, or Firm*—Albert L. Jeffers; John F. Hoffman

[57] ABSTRACT

The present invention relates to a mechanical press, and in particular to such a press having a crown portion with an open top thereby permitting the crankshaft and connection arm assembly to be lowered therein in a preassembled state. Next, a cover plate is connected to the crown and the press motor assembly is mounted thereon. Belt connections to the drive assembly can be made through openings in the cover plate and access to the drive assembly can be had through removable doors on the ends of the crown. Preferably, the press frame comprising the bed, uprights and crown are formed as a single casting thereby avoiding the necessity for tie rods.

8 Claims, 12 Drawing Figures

METHOD OF ASSEMBLING A MECHANICAL PRESS HAVING A DROP IN DRIVE ASSEMBLY

This is a division, of application Ser. No. 299,828, filed Sept. 8, 1981, now U.S. Pat. No. 4,397,232 issued Aug. 9, 1983.

BACKGROUND OF THE INVENTION

The present invention relates to a mechanical press, and in particular to such a press having a crankshaft and connection arm assembly which is capable of being inserted into the crown portion of the press in its preassembled form.

A conventional mechanical press comprises a bed which is mounted to a platform or the floor of the shop, a vertically spaced crown portion in which the drive assembly for the slide is contained, and one or more uprights rigidly connecting the bed and crown and maintaining the bed and crown in vertically spaced relationship. The crown contains the drive assembly, which typically comprises a crankshaft having one or more eccentrics thereon and connections connected to the eccentrics of the crankshaft at their upper ends and to the slide at their lower ends, either directly or through a piston arrangement. The slide is mounted within the uprights for vertical reciprocating motion and is adapted to have the upper half of the die set mounted to it with the other half mounted to the bolster, which is connected to the bed.

At one end of the crankshaft, there is usually mounted a flywheel and clutch assembly wherein the flywheel is connected by a belt to the output pulley of the motor so that when the motor is energized, the massive flywheel rotates continuously. When the clutch is energized, the rotary motion of the flywheel is transmitted to the crankshaft which causes the connecting arms to undergo rotary-oscillatory motion that is transmitted to the slide assembly by means of a wrist pin, for example, so that the rotary-oscillatory motion is converted to straight reciprocating motion. The slide is usually mounted in the space defined by the crown, bed and uprights and is guided for rectilinear movement along an axis substantially perpendicular to the plane of the bed.

In the standard press, the crown, uprights and bed are formed as separate units and are connected to each other by means of large tie rods which extend downwardly through openings in the crown, upright and bed and are secured in place by means of large nuts. Due to the very large torque which must be applied to the nuts in order to load the tie rods properly, it is standard practice to heat the tie rods, tighten the nuts and then permit the tie rods to cool thereby contracting in length and becoming loaded to the proper degree. In a press of this type, the crankshaft and connection arms are installed in the crown by inverting the crown, installing the cranks and bearings with the crown inverted, and then assembling the crown containing the crankshaft and connections on top of the uprights and shrinking down the tie rods. This assembly procedure is time consuming and difficult to perform because it necessitates the handling of the large crown casting and a difficult insertion of the components making up the drive assembly. A further disadvantage is the difficulty in servicing the press because to obtain full access to the drive assembly, it is necessary to heat up the tie rods, remove the top nuts, and remove and invert the crown.

SUMMARY OF THE INVENTION

In the press, the crown portion of the press, which may be integral with the uprights and bed, has an open top thereby enabling the crankshaft assembly to be dropped downwardly into it and seated on accurately machined pads for the main bearing blocks. A cover plate is then fastened to the top of the crown and the motor assembly mounted to it. The drive belt from the motor to the flywheel extends through a notch in the cover plate, and the calipers for the brake can also be mounted to the cover plate in such a position that they are disposed around the brake disc when the cover plate is in place.

In assembling the press according to one form of the present invention, the crankshaft, connection arms, weight for the dynamic balancer, brake disc and flywheel and clutch assembly are preassembled together into a single modular unit. Then, this assembly is lowered into the crown and the pistons in the connection assembly is guided through openings in the bottom of the crown so that the slide can later be attached to them. The bearing blocks can also be preassembled to the crankshaft assembly and placed on accurately machined bearing pads within the crown. Once the crankshaft assembly has been bolted in place, the top cover plate is fastened to the upper edge of the crown, the motor assembly connected to it and the appropriate belt connections made. The guide pins for the dynamic balancer weight are then inserted into the weight from below through openings in the crown and are rigidly connected to the crown. Similarly, the cylinders for the pistons can be inserted from below around the pistons and bolted to the underneath surfaces of the crown. In another form of the invention, the balancer weight can be connected to the crankshaft after it is lowered into place.

Since the press frame comprising the bed, uprights and crown can be formed as a single casting, tie rods are no longer necessary to hold these three major components together. The drive assembly can more easily be assembled apart from the crown and then dropped in place as a single unit with the necessary connections made in the crown in a relatively short period of time due to the accessibility of the crown through the top opening. Furthermore, maintenance of the drive assembly is facilitated because it can be completely removed simply by disconnecting the slide, removing the top cover plate and lifting the entire drive assembly out of the crown.

Specifically, the present invention relates to a mechanical press and the method for assembling it wherein the press has a rigid frame comprising a bed, a crown and at least one upright interconnecting the bed and crown, a drive assembly including a crankshaft, at least one connection arm assembly connected to the crankshaft, and a pair of bearing blocks that rotatably support the crankshaft. The crank chamber in the crown has four sides and a bottom with the top of the chamber being open in the upward direction, the crown including at least two support surfaces in the crank chamber and at least one opening in the bottom thereof. The connection arm assembly is connected to the crankshaft, and then the interconnected crankshaft and connection arm assembly is lowered into the open top of the crown into the crank chamber while guiding the lower portion of the connection arm assembly, such as the piston, through the opening in the bottom of the crown crank chamber until the interconnected crankshaft and connection arm assembly rests on the support surfaces and the lower portion of the connection arm assembly protrudes through the opening in the bottom of the crank chamber. The slide is then connected to the end of the connection arm assembly protruding through the opening.

It is an object of the present invention to provide a mechanical press having a crown portion open at the top so that the crankshaft and connection arm assembly can be lowered therein as a preassembled unit.

A further object of the present invention is to provide a mechanical press wherein the assembly time associated with the drive assembly is reduced and maintenance of the drive assembly is facilitated.

A still further object of the present invention is to provide a mechanical press wherein the crown, uprights and bed are a single casting thereby avoiding the necessity for large tie rods extending through the crown, uprights and bed.

These and other objects of the present invention will be apparent from the detailed description considered together with the appropriate drawing figures.

DETAILED DESCRIPTION OF A PREFERRED EMBODIMENT

Figure 1:
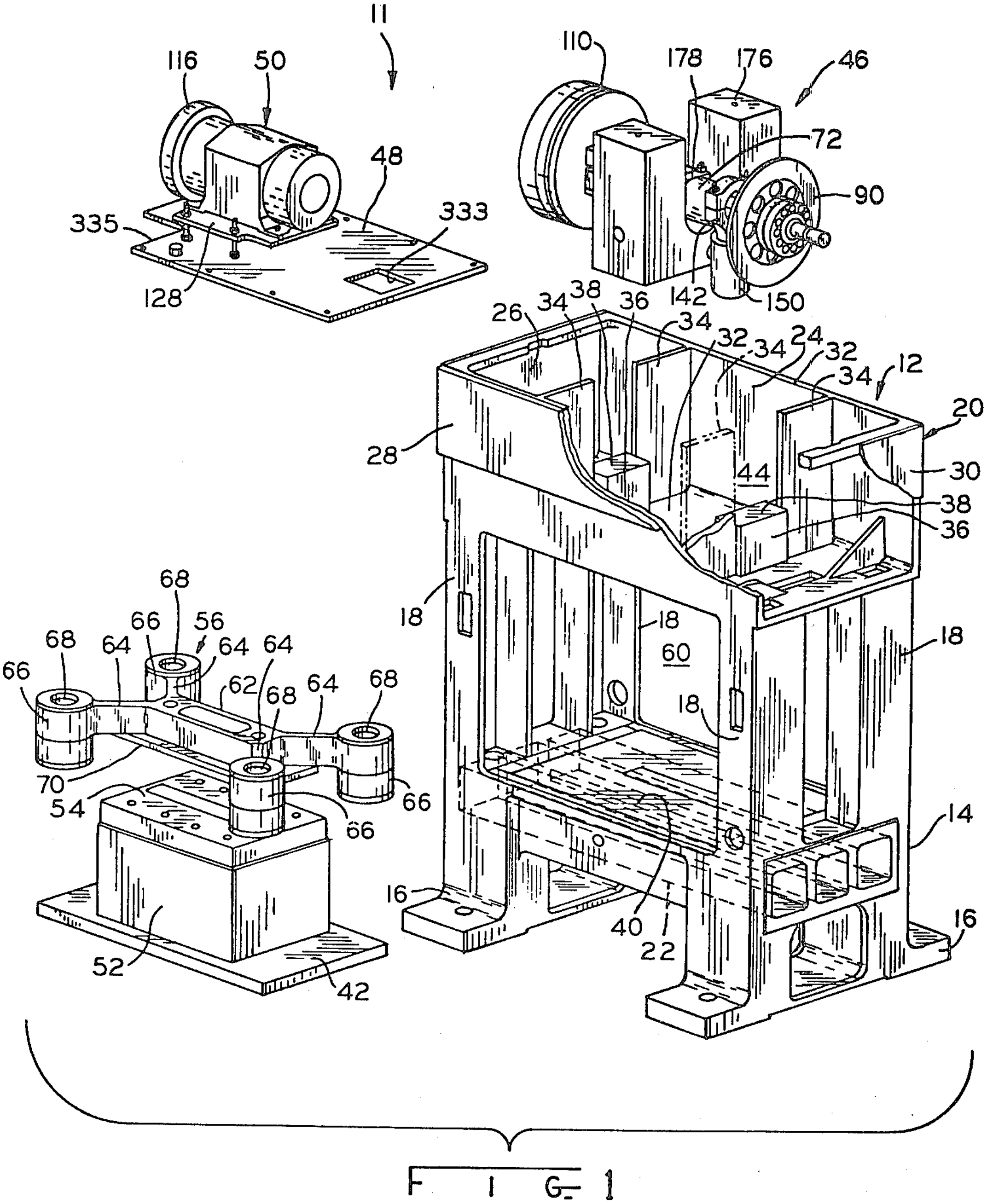
FIG. 1 is an exploded perspective view of the press according to the present invention.

FIG. 1 illustrates the press 11 assembled by the method of the present invention in exploded form, and it will be noted that the major subassemblies of the press are modular in nature. The press comprises a frame 12, which is a single casting and comprises a bed 14 supported on legs 16, four uprights 18 integral with bed 14 and extending upwardly therefrom, and a crown 20 integral with uprights 18. Bed 14 includes three horizontal chambers 22 extending laterally therein and being interconnected at their ends to form a single oil pump within bed 14. As will be described later, sump 22 receives the oil which has dripped through the thermal exchange devices on uprights 18 so that it can be pumped upwardly again to crown area 20.

Crown 20 comprises sides 24 and 28 and removable doors 26 and 30 and a bottom 32 integral with sides 24 and 28. It will be noted that the crown 20 terminate in an upper edge 32 so that the top of crown 20 is open. Vertical web-like partition members 34 are also integral with sides 24,28 and bottom 32. A pair of bearing support pads 36 are integral with partition elements 34 and bottom 32 and each include a very accurately machined bearing block support surface 38 which is parallel with the surface 40 of bed 14 on which bolster plate 42 is mounted. The sides 24–30 and bottom 32 of crown 20 together define the crank chamber indicated as 44.

As will be described in greater detail at a later point, crown 20 is open in the upward direction so that the drive assembly 46 can be inserted vertically therein in a completely assembled form as a modular subassembly. After the drive assembly 46 is in place, coverplate 48 is bolted to crown 20 and motor assembly 50 is mounted thereon.

Bolster plate 42 to which bolster 52 is mounted is bolted to the upper surface 40 of bed 14, in a manner to ensure that the upper surface 54 of bolster 52 is absolutely parallel to the bearing block support surfaces 38 of bearing support pads 36 in crown 20. In a manner well known in the art, bolster 54 is adapted to have the lower half of the die set (not shown) mounted thereto.

Figures 6, 7:
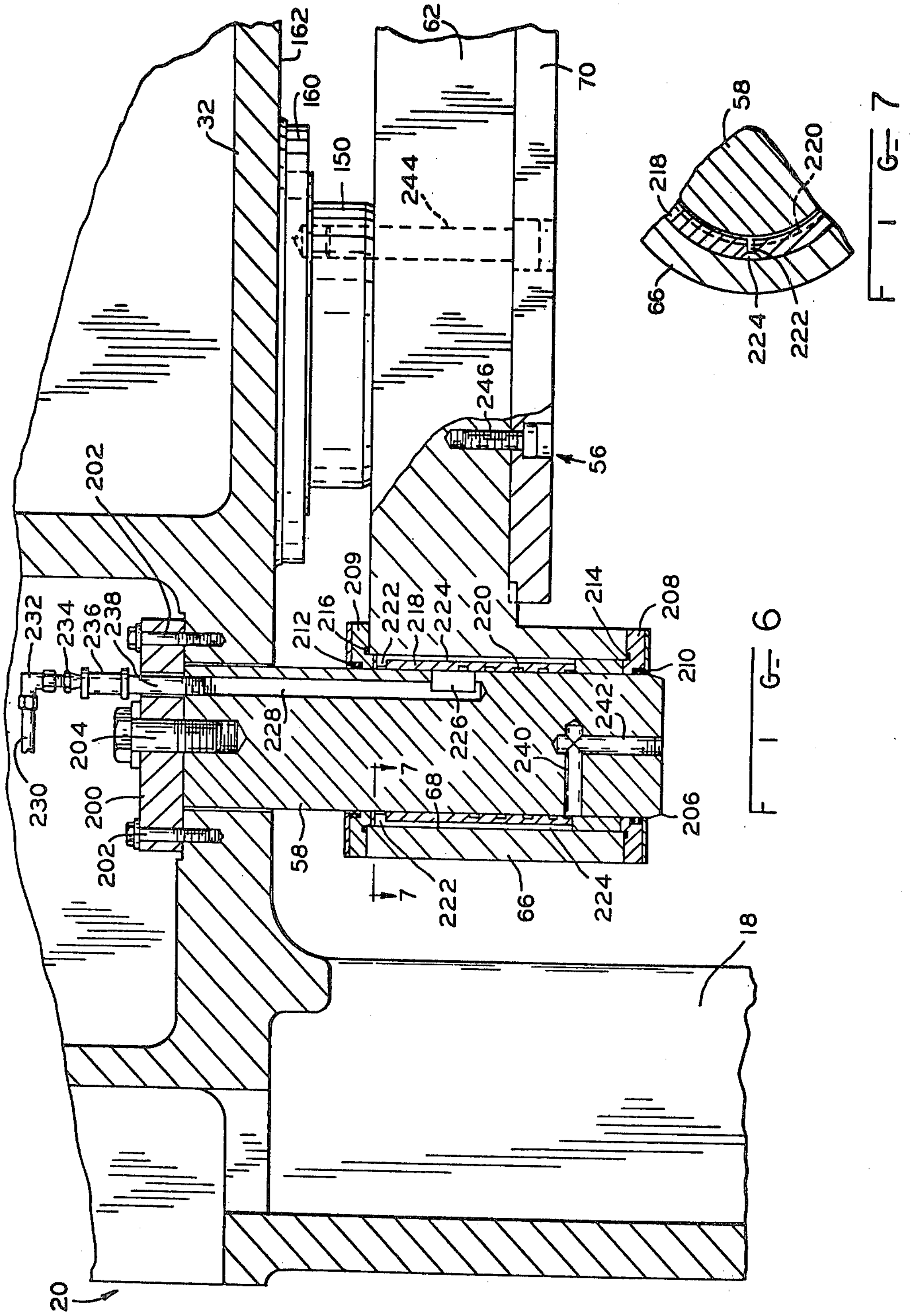
FIG. 6 is a fragmentary sectional view of the slide and guidepost assembly.
FIG. 7 is a sectional view taken along line 7—7 of FIG. 6 and viewed in the direction of the arrows.

Slide 56 is mounted on four guideposts 58 (FIG. 6) that are rigidly connected to and depend downwardly from crown 20 and is adapted to slide over the guideposts in a rectilinear manner within the opening 60 between crown 20 and bolster 54 and between the left and right pairs of uprights 18. Slide 56 comprises a center portion 62, four web members 64 extending outwardly therefrom in a horizontal direction, and four bushing assemblies 66 integrally connected to web members 64. Web members 64 are relatively thin in relation to their height so that the mass of the slide 56 can be maintained as low as possible yet there is sufficient stiffness and rigidity to resist deformation in the vertical direction. By way of example, web members 64 could have a thickness of 2.5 inches and a height of 5.5 inches. The bushing assembly 66 each comprises an opening 68 extending completely therethrough and adapted to receive and be guided by guideposts 58 (FIG. 6). A slide plate 70 is removably mounted to the lower surface of slide 56 and includes a drill hole pattern suitable for the particular die set used.

Referring now to FIGS. 2 through 5, the drive assembly 46 will be described in greater detail. Drive assembly 46 comprises a crankshaft 72 having three eccentrics 74, 76 and 78 thereon, crankshaft 72 being rotatably supported within main bearing blocks 80, which are supported on the upper support surfaces 38 of pads 36. Bearing blocks 80 are of the split type and each comprise a cap 82 connected to the lower portion thereof and to pads 36 by bolts 84. Main bearings 86 are mounted within bearing blocks 80 and the portions 88 of crankshaft 72 are journaled therein.

Figure 2:
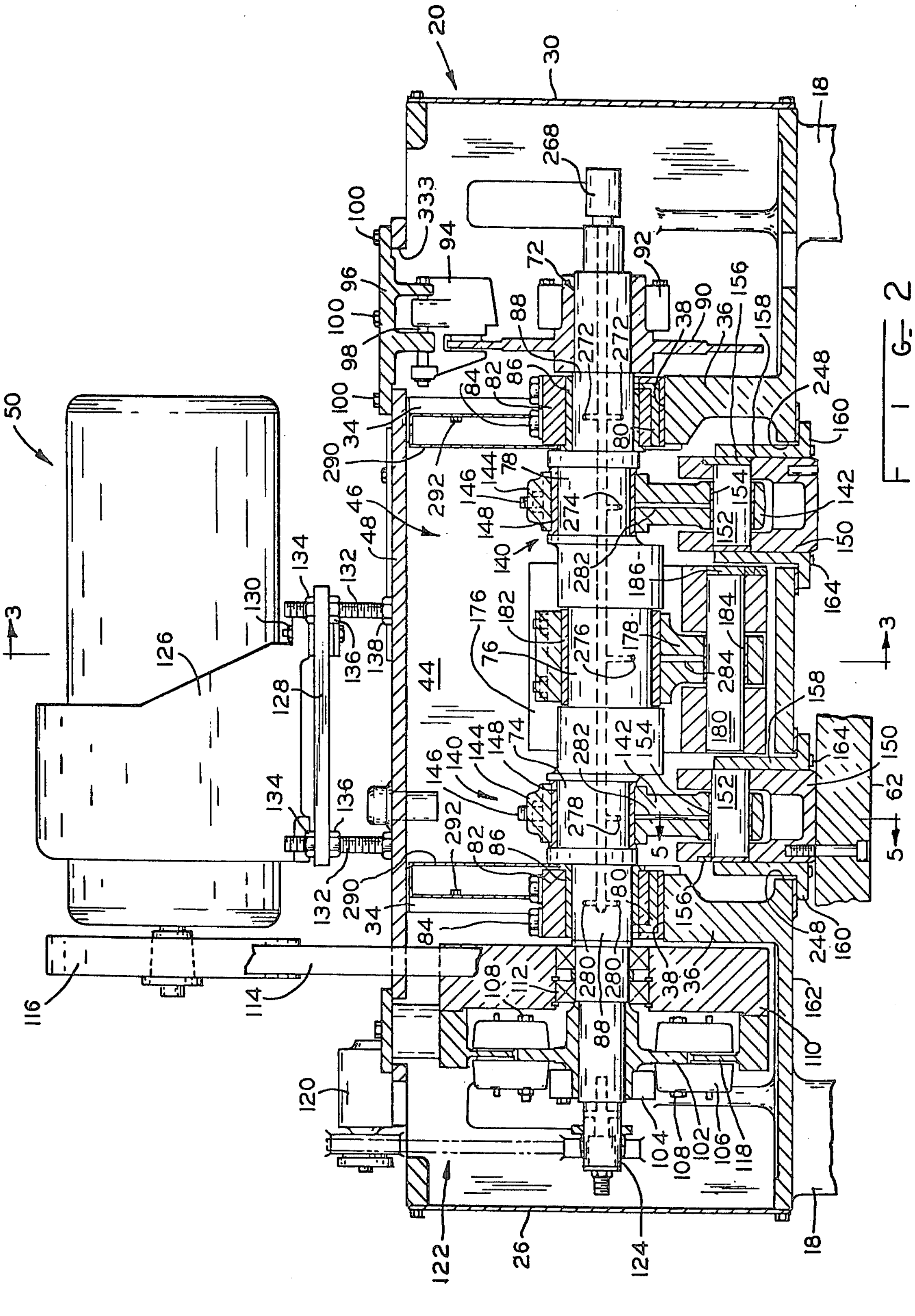
FIG. 2 is a sectional view of the crown and drive assembly of the press.

A brake disc 90 is frictionally mounted to the rightmost end of crankshaft 72 as viewed in FIG. 2 by means of Ringfeder 92, and a brake caliper 94 is mounted to bracket 96 by stud and nut assembly 98 such that it engages brake disc 90 when energized. Bracket 96 is connected to cover plate 48 by screws 100.

Still referring to FIG. 2, a clutch hub 102 is frictionally clamped to crankshaft 72 by Ringfeder 104, and has a plurality of calipers 106 rigidly connected thereto by bolts 108. A flywheel 110 is rotatably supported on crankshaft 72 by bearings 112 and is driven by a flat belt 114. Belt 114 is disposed around motor pulley 116, which is driven by motor 50. When motor 50 is energized, flywheel 110 constantly rotates but does not drive crankshaft 72 until clutch calipers 106 are energized. At that time, the friction disc 118 of flywheel 110 is gripped and the rotating motion of flywheel 110 is transmitted to crankshaft 72 through calipers 106 and hub 102. Solid-state limit switch 120 is driven by a pulley and belt arrangement 122 from the end of crankshaft 72 and controls various press functions in a manner well known in the art. Rotary oil distributor 124 supplies oil to the left end of crankshaft 72.

Motor 50 is connected to cover plate 48 by means of bracket 126 connected to mounting plate 128 by bolts 130, plate 128 being connected to cover plate 48 by studs 132 and lock nuts 134, 136, and 138. The tension on belt 114 can be adjusted by repositioning plate 128 on studs 132 by readjusting the positions of lock nuts 134 and 136 along studs 132.

In the preferred embodiment, the drive assembly 46 comprises two connection assemblies 140 each comprising a connection arm 142 having a connection cap 144 connected thereto by stud and nut assembly 146. Bearings 148 are disposed between the respective connection arms 142 and the eccentrics 74 and 78 of crankshaft 72. Connection assemblies 140 are similar to those disclosed in U.S. Pat. No. 3,858,432, which is owned by the assignee of the present application, and comprise pistons 150 rotatably connected to connection arms 142 by wrist pins 152 and bearings 154. Keys 156 lock wrist pins 152 to pistons 150.

Figure 4:
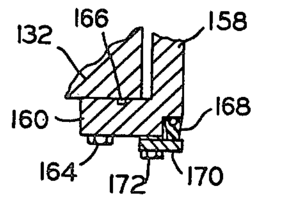
FIG. 4 is an enlarged fragmentary view of the sealing arrangement for the pistons and cylinders.

Pistons 150 are slidably received within cylinders 158, the latter including flanges 160 connected to the lower surface 162 of crown 20 by screws 164 and sealed thereagainst by O-rings 166 (FIG. 4). Seals 168 provide a sliding seal between pistons 150 and their respective cylinders 158 and are held in place by seal retainers 170 and screws 172 (FIG. 4).

The press 11 is dynamically balanced to counteract the movement of connection assemblies 140 and slide 62 by means of a balancer weight 176 connected to the eccentric 76 of crankshaft 72 by counterbalance connection arm 178 and wrist pin 180. Bearings 182 and 184 have eccentric 76 and wrist pin 180, respectively, journaled therein, and key 186 locks wrist pin 180 to weight 176.

Figure 3:
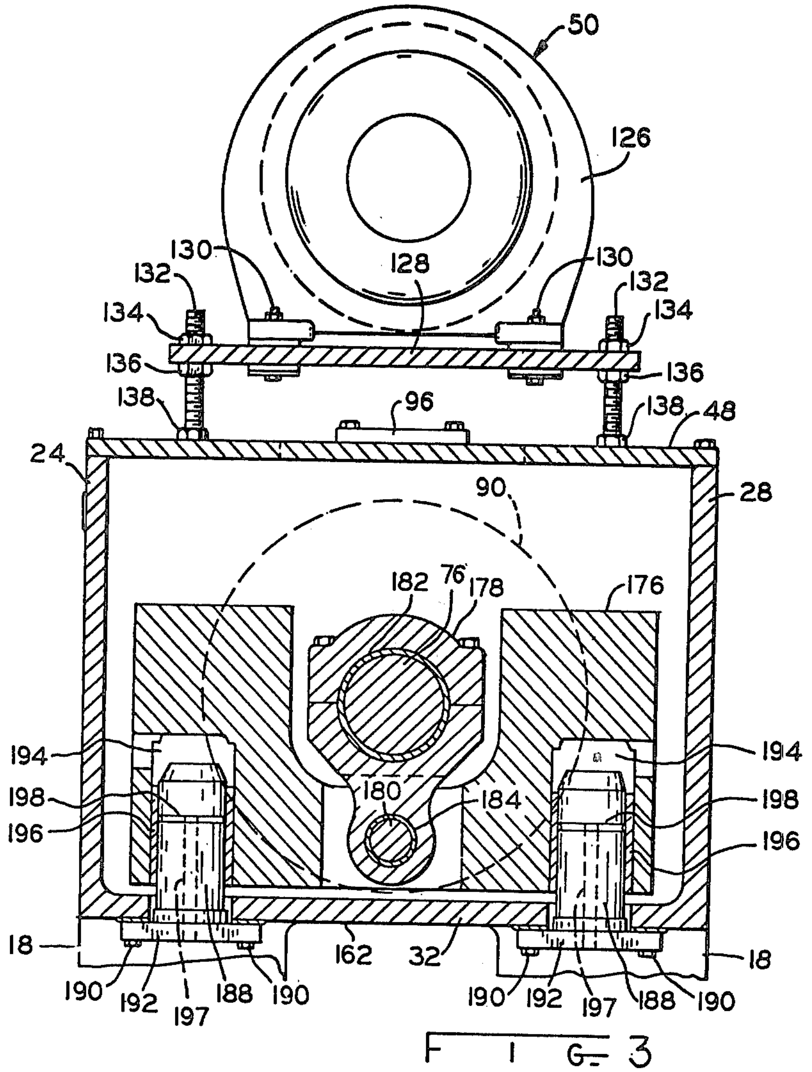
FIG. 3 is a sectional view taken along line 3—3 of FIG. 2 and viewed in the direction of the arrows.

Referring to FIG. 3, it will be seen that weight 176 is guided by means of a pair of guide pins 188 connected to the lower surface 162 of crown bottom 32 by screws 190 extending through flange portions 192. Guide pins 188 are received within openings 194 and guided by bearings 196. An axial passageway 197 conducts lubricating oil to groove 198 in order to lubricate the interface between pins 188 and their respective bearings 196. It will be seen that the position of eccentric 76 relative to eccentrics 74 and 78 on crankshaft 72 is 180° out of phase so that weight 176 moves rectilinearly in the opposite direction as pistons 150 and slide 62 in order to dynamically balance the press. Pins 188 are parallel to guideposts 58 so that slide 62 and weight 176 move in opposite directions vertically.

Referring now to FIGS. 6 and 7, the guiding of slide 62 will be described. Four guideposts 58 are rigidly connected to the bottom 32 of crown 20 by means of flanges 200, with screws 202 connecting flanges 200 to crown 20 and screws 204 connecting guideposts 58 to flanges 200. There are four such guideposts connected to crown 20 in a symmetrical pattern in alignment with the openings 68 in bushing portions 66 of slide 56, and it will be noted that, unlike prior mechanical presses, pins 58 have distal ends 206 which terminate short of bed 14. In prior art mechanical presses, it is more common to utilize tie rods extending from the crown to the bed on which the slide is guided, or the slide is guided by gib surfaces fastened to the corners of the uprights. As discussed earlier, the relatively short extension of guideposts 58 and the fact that they are connected only to the crown 20 is advantageous in ensuring that they are parallel to each other, a condition which is imperative if slide 56 is to move perpendicularly relative to bolster 52.

A pair of seal plates 208 and 209 are connected to the upper and lower ends of bushing portions 66 and contain seals 210 and 212 and O-rings 214 and 216, respectively. Bearings 218 having a spiral groove 220 therein are received within openings 68 in bushing portions 66 of slide 56 and serve to establish oil films between them and the outer surfaces of guideposts 58 as slide 56 reciprocates. A pair of radial passages 222 are connected with a pair of axial passages 224, and oil is supplied to spiral groove 220 through slot 226 from axial passage 228. Oil is supplied to passage 228 from hose 230 through fittings 232, 234, 236 and nipple 238, and is conducted away from guideposts 58 through drains 240 and 242.

Slide 62 is connected to the protruding ends of pistons 150 by screws 244 extending through the central portion 62 of slide 56, and slide plate 70 is connected to the slide center portion 62 by screws 246. As shown in FIG. 2, pistons 158 extend through openings 248 in the bottom 32 of crown 20.

As crankshaft 72 rotates, connection arms 142 reciprocate pistons 150 within cylinders 158 along axes parallel to the axes of guideposts 58. Although guideposts 58 guide slide 56 with very close tolerances, a front-to-back tilting problem has been observed in connection with slide 56 as it is reciprocated. As the eccentrics 74 and 78 of crankshaft 72 move beyond their top dead center positions, they transmit to pistons 150 not only a component of force in the vertical direction, but also a horizontal component which, due to the rigid connection between pistons 150 and slide 56, tends to cause slide 56 to tilt about a horizontal axis parallel to the axis of crankshaft 72. Not only does this tilting movement of slide 56 result in accelerated wear of the guide bearing surfaces, but can result in unsatisfactory performance of the press in precision forming and stamping operations.

Figure 5:
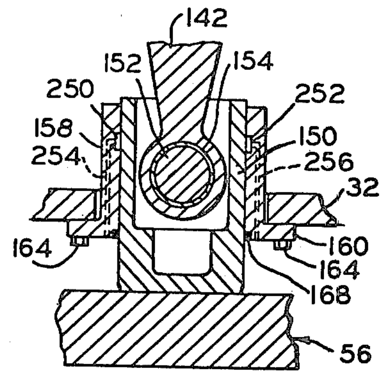
FIG. 5 is a sectional view taken along line 5—5 of FIG. 2 and viewed in the direction of the arrows.

In order to counteract this tilting force precisely at the point that it is exerted on pistons 150, a pair of hydrostatic bearings 250 and 252 are provided in cylinders 158 at positions directly opposite each other in a front-to-back direction intersecting the axis of pistons 150 and lying along lines which are intersected by the perspective wrist pins 152 as pistons 150 are reciprocated. This relationship is illustrated in FIG. 5 wherein the slide is shown in its bottom dead center position. Fluid is supplied to hydrostatic bearings pockets 250 and 252 through passages 254 and 256, respectively. The pressurized hydraulic fluid exerted at the four points shown resist the tendency of pistons 150 to tilt in the front-to-back direction, and because the hydrostatic forces applied in the area of the wrist pins 152, the maximum resistive effect of the forces is realized.

Figure 8:
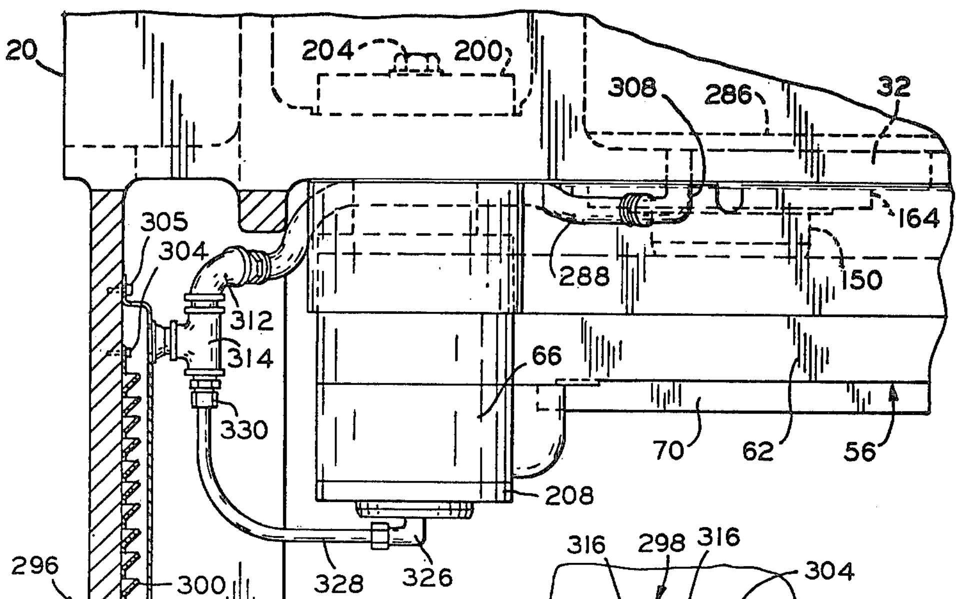
FIG. 8 is a sectional view of one of the thermal exchange devices.
Figure 8:
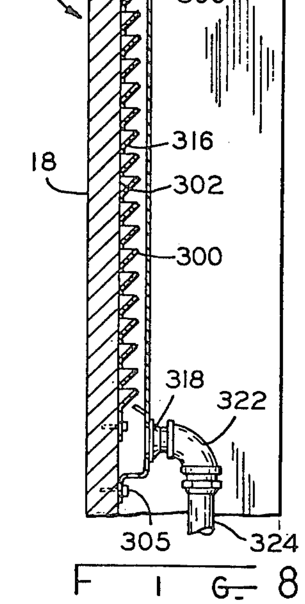
Figure 9A:
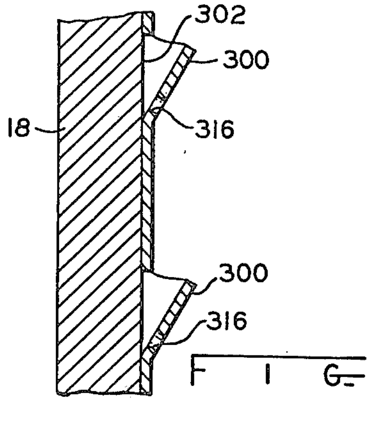
FIG. 9A is a sectional view of FIG. 9 taken along line 9A—9A.
Figure 9:
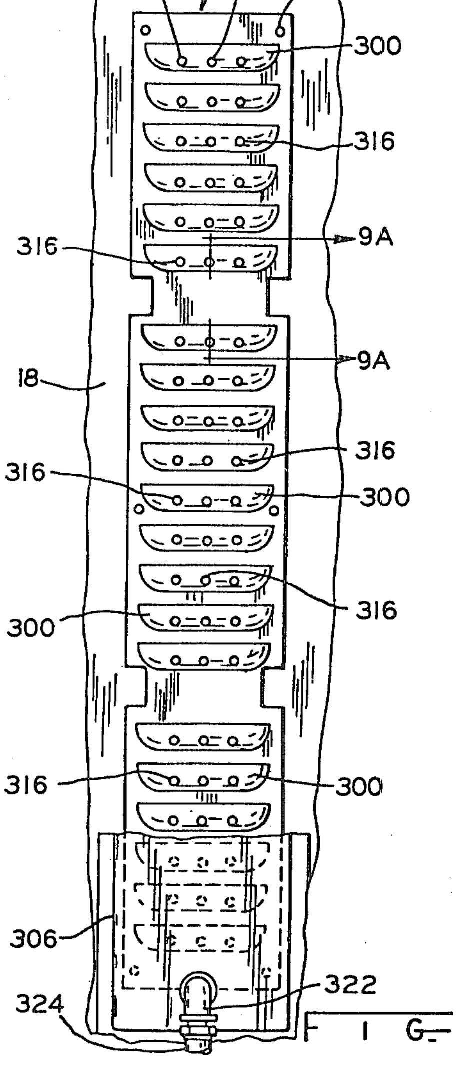
FIG. 9 is a front elevational view of the baffle plate.
Figure 10:
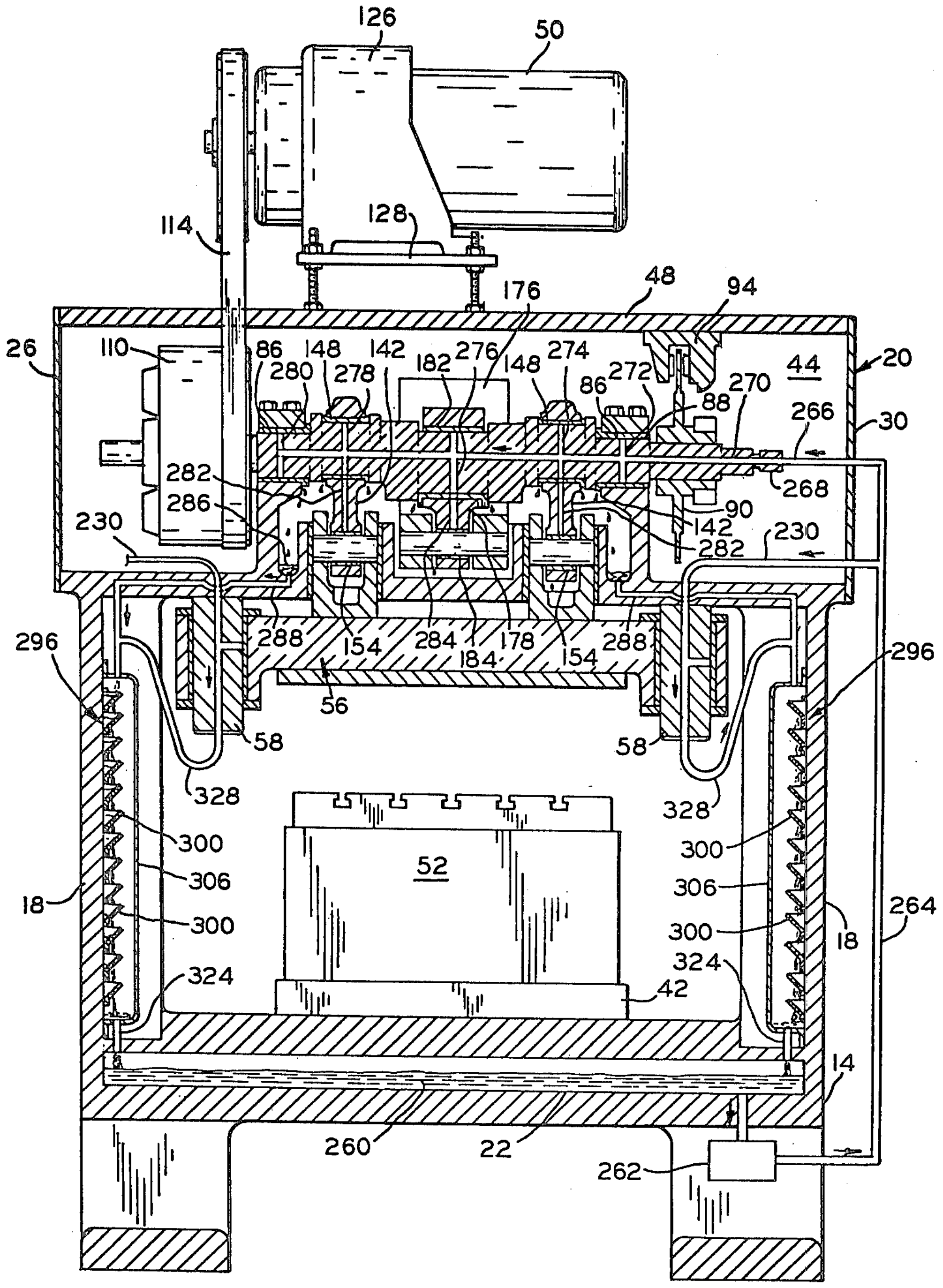
FIG. 10 is a diagrammatic view of the press showing the oil recirculation system.

With reference now to FIGS. 2, 6, 8, 9 and 10, the oil distribution and thermal stability system of the press will be described. As shown in FIG. 10, the lubricating oil 260 collects in sump 22 in bed 14 and is pumped by pump 262 upwardly through fluid line 264 to crown 20.

Fluid line 266 connects to rotary oil distributor 268 that has an outlet connected to an axial passageway 270 in crankshaft 72. The oil flows from axial passageway 270 to bearing 86 through radial passages 272 in crankshaft 72, to bearing 148 through axial passages 274, to bearing 182 through axial passages 276, to bearing 148 through axial passages 278, and to bearing 86 through axial passages 280. Oil is supplied to wrist pin bearings 154 and 184 through passages 282 in connections 142 and passage 284 in dynamic balancer connection 178. The oil, which picks up heat from the drive assembly drains downwardly and is collected in a very shallow sump 286 within crown 20 and is drained therefrom through hoses 288. As shown in FIG. 2, a pair of sheet metal oil guards 290 are connected to partition members 34 and sealed thereagainst by seals 292. Guards 290 serve to seal the central portion of crank chamber 44 and permit all of the oil to be collected in its sump 286.

In order to compensate for the thermal growth of connections 142 due to the frictional heat generated as press 11 operates, heat is imparted to uprights 18 by means of circulating the oil from crown 20 through four thermal exchange devices 296 mounted on each of the uprights 18. In order that the uprights 18 elongate at the same rate as the connection assemblies 140 so that a constant shutheight is maintained, it is necessary that the following relationship be satisfied:

$$L_c dT_c a_c = L_u dT_u a_u$$

wherein $L_c$ is the length of the connections 142, $dT_c$ is the change in temperature of the connections 142, $L_u$ is the length of the uprights 18, $dT_u$ is the temperature change of the uprights, and $a_c$, $a_u$ are the coefficients of thermal expansion. What must be done is to impart the proper amount of heat per unit time to uprights 18 so that their change in temperature per unit time is proper to balance the equation given the change in temperature of the connections 142.

The thermal exchange device for accomplishing this according to the preferred embodiment of the invention is shown in detail on FIGS. 8 and 9 and comprises a stamped baffle plate 298 made of a material which may be a good thermal conductor, such as aluminum, or even a poor thermal conductor, such as molded plastic. Baffle plate 298 has a plurality of baffles 300 formed therein each adapted to hold a small pool of the hot oil drained from crown 20. Baffle plate 298 is mounted flush against the inner surface 302 of the respective upright 18 so that the individual baffles 300 cause the pools of oil to be held against the surface 302 of the upright 18. Baffle plates 298 are mounted to uprights 18 by screws 304. Also mounted to uprights 18 by screws 305 are four cover plates 306. Oil from sump 286 in crown 20 is conducted to the chambers formed between cover plates 306 and the inner surfaces 302 of the respective uprights by fitting 308, hose 288, fitting 312 and tee 314. Most of the oil is caught by the uppermost baffle 300 and held momentarily in contact with the inner surface 302 of respective upright 18. A plurality of holes 316 are formed in baffles 300 and cause the oil to drip from one baffle to the next so that the oil cascades down the baffles 300 of baffleplate 298 until it reaches outlet fitting 318. By means of this device, the hot oil from crown 20 is formed into a plurality of vertically spaced pools and held momentarily in contact with the upright so that a portion of its heat, which is the waste heat generated by friction in the crown 20, is imparted to the upright. The amount of heat which is transferred can be readily adjusted by varying the size of openings 316, by changing the spacing of baffles 300, by changing the size of baffles 300, and other possible alternatives. When the press is manufactured, the baffle plates 298 will be fine tuned so that the proper heat transfer occurs.

After the oil has drained through the heat transfer devices 296 and the uprights 18, it is conducted by fitting 322 and hose 324 to the sump 22 within bed 14.

Lubricating oil is pumped to guideposts 58 through hoses 230, fittings, 232, 234, 236 and nipples 238 (FIG. 6), and the return oil is conducted to fitting 314 (FIG. 8) through fitting 326, hose 328 and fitting 330. Once the oil has reached sump 22, it is again circulated to crown 20 by pump 262 and hose 264. Thus, the oil is continuously recirculated to the crown wherein it picks up waste heat generated by the frictional forces in the drive assembly, waste heat generated by the frictional forces in the drive assembly, drains through the thermal transfer devices 296 on the uprights 18 whereupon the proper amount of heat is transferred to the uprights 18 so that they will thermally expand at the same rate as connections 142, and is collected in the sump 22 and bed 14 for recirculation to crown 20. The advantage to this type of thermal stabilization system over the prior art techniques of utilizing electric heaters is that there is a direct relationship between the temperature of the oil and the temperature of the connections, and by using this same oil to heat the uprights, the system can be fine tuned so that thermal expansion of the uprights 18 and connections 142 occurs at the same rate.

Figure 11:
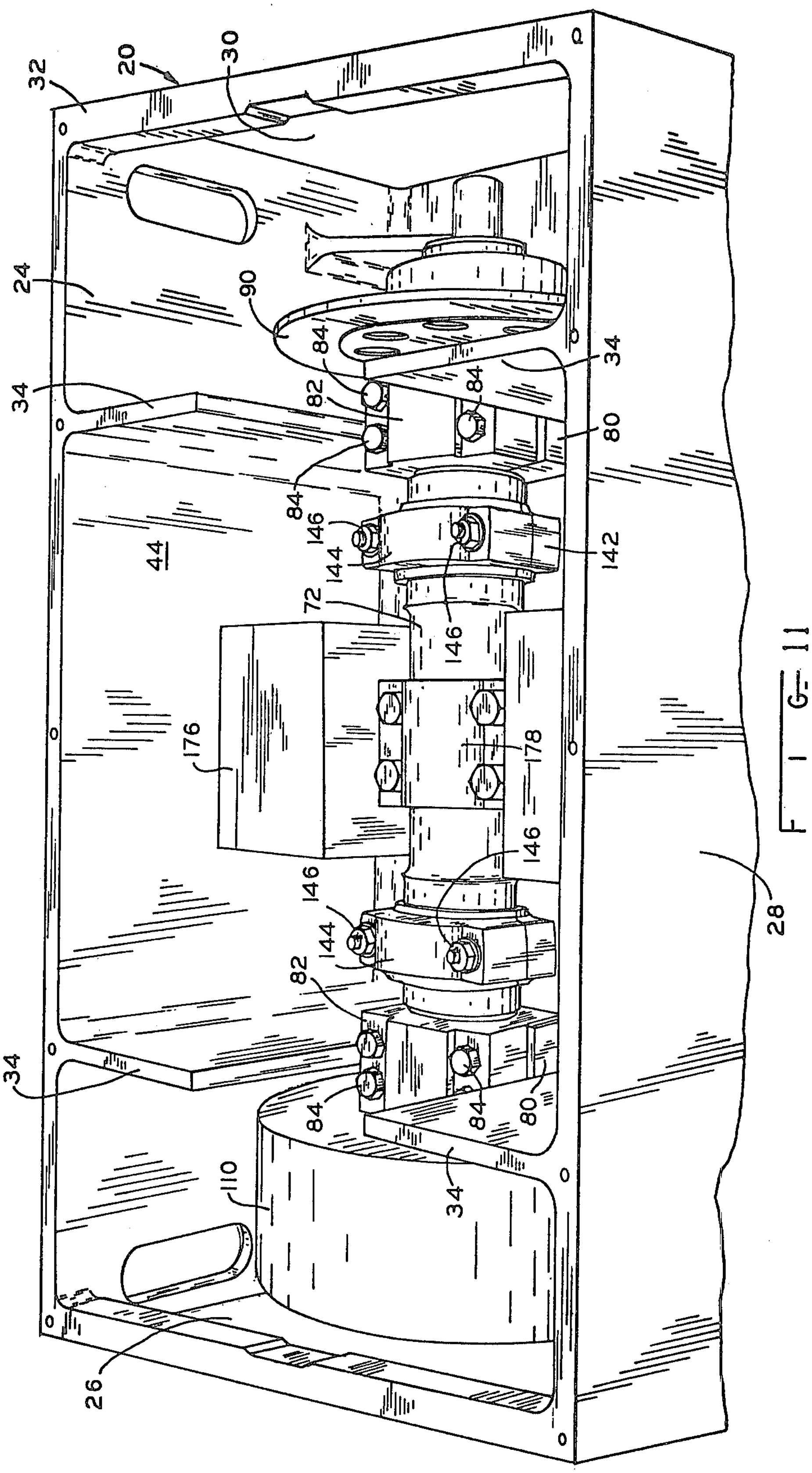
FIG. 11 is a top perspective view of the crown area of the press.

As alluded to earlier, press 11 is modular in nature and the major subassemblies thereof can be installed in preassembled form. This is particularly advantageous in connection with the drive assembly 46 comprising crankshaft 72 to which is attached the connections 142 and 178, pistons 150, weight 176, brake disc assembly 90, flywheel 110 and clutch caliper assembly 106, 102. Crown 20, which is integral with uprights 18, includes a drive assembly chamber 44 defined by sides 24, 26, 28 and 30 and bottom 32, and is open in the upward direction. When the entire drive assembly has been preassembled, it can be lowered into crank chamber 44 as shown in FIG. 1 to the position shown in FIG. 11. The lower portions of the main bearing blocks are first emplaced on the upper surfaces 38 of pads 36, the drive assembly is then lowered into place on the lower halves 80 of the bearing blocks, the top halves are emplaced and then fastened to the lower halves and to pads 36 by bolts 84.

After the drive assembly is in place, the cover plate 48 is attached to crown 20 and brake caliper and bracket assembly 94, 96, 98 is inserted through opening 333 to the position illustrated in FIG. 2, whereupon it is secured in place by screws 100. Motor assembly 50 is then mounted to cover plate 48. Limit switch 120 is driven by the pulley on the end of crankshaft 72. and the belt 122 extends into chamber 44.

As drive assembly 46 is lowered into crown chamber 44, pistons 150 are guided through openings 248 (FIG. 2) in crown 20 so that they protrude beyond the lower surface 162 of crown 20. Cylinders 158 can either be installed prior to the installation of drive assembly 46 or afterwards by pushing them upwardly through openings 248 and then holding them in place. Next, slide 56 is mounted to pistons 150 by screws which extend through the central portion 62 thereof. As the drive assembly 46 is lowered into chamber 44, the main bearing block portions 80, 82 pass between partition webs 34 (FIG. 1). The drive belt 114 from motor 50 to flywheel 110 extends through a notch 335 in top cover plate 48, which is shown in FIG. 1.

Side members 26 and 30 of crown 20 are removable so that the hydraulic connections and other adjustments can be made in connection with fluid unions 124 and 268. Bolster 52 and bolster plate 42 are mounted to bed 14 in the customary manner.

While this invention has been described as having a preferred design, it will be understood that it is capable of further modification. This application is, therefore, intended to cover any variations, uses, or adaptations of the invention following the general principles thereof and including such departures from the present disclosure as come within known or customary practice in the art to which this invention pertains and fall within the limits of the appended claims.

What is claimed is:

1. In a mechanical press having a rigid frame comprising a bed, a crown, a slide, and at least one upright rigidly interconnecting the bed and crown, a drive assembly including a crankshaft, and at least one connection arm assembly connected to the crankshaft, the method of assembling the drive assembly and slide to the frame comprising:
   - providing a crank chamber in the crown having four sides and a bottom, the top of the chamber being open in the upward direction, and the crown including at least two support surfaces in the crank chamber and at least one opening in the bottom of the crank chamber,
   - connecting the connection arm assembly to the crankshaft,
   - with the uprights fixed to the bed and with the crown fixed to and supported on the uprights, subsequently lowering the interconnected crankshaft and the connection arm assembly into the crank chamber through the open top thereof while guiding the connection arm assembly through the opening in the bottom of the crank chamber until the interconnected crankshaft and connection arm assembly rests on the support surfaces and one end of the connection arm assembly protrudes through the opening in the bottom of the crank chamber,
   - and then fastening the crankshaft to the crown, positioning the slide between the bed and crown, and connecting the slide to the end of the connection arm assembly protruding through the opening.

2. The method of claim 1 including the step of fastening a cover plate over the top of the chamber to enclose the chamber after the drive assembly has been inserted therein.

3. The method of claim 1 wherein the connection arm assembly comprises a connecting arm connected to the crankshaft and a piston connected to the connecting arm, and including a cylinder mounted within the opening in the bottom of the crank chamber; and wherein the piston is guided through the cylinder during insertion of the drive assembly and protrudes through a lower end of the cylinder when the crankshaft and connection arm assembly is fully seated in the crown; and the slide is then connected to the piston.

4. The method of claim 3 further including connecting a dynamic balancer weight to the crankshaft by a second connecting arm prior to the insertion of the crankshaft into the crank chamber and the inserting the weight and second connecting arm into the chamber together with the crankshaft and first-mentioned connecting arm.

5. The method of claim 1 including the step of connecting a flywheel and clutch assembly and a brake disc to the crankshaft prior to the insertion of the crankshaft into the crank chamber, and then inserting the flywheel and clutch assembly and brake disc into the chamber together with the crankshaft and connection arm assembly.

6. The method of claim 5 including the subsequent step of mounting a cover plate over the top of the chamber to enclose the chamber, mounting a motor to the cover plate, and connecting the motor and flywheel by a drivebelt.

7. The method of claim 1 wherein the crown includes a pair of bearing support pads, and including the step of connecting a pair of bearing blocks to the crankshaft prior to inserting the crankshaft and connection arm assembly into the crown, and then lowering the crankshaft, connection arm and bearing block assembly into the crown until the bearing blocks rest on the bearing support pads.

8. The method of claim 1 including the step of installing a dynamic balancer weight and connecting arm in the crown prior to the step of inserting the crankshaft and connection arm assembly into the crown, and including the further step of connecting the dynamic balancer weight connecting arm to the crankshaft by means of a connecting arm cap.

* * * * *

UNITED STATES PATENT AND TRADEMARK OFFICE

CERTIFICATE OF CORRECTION

PATENT NO. : 4,475,278

DATED : October 9, 1984

INVENTOR(S) : Robert L. Schockman

It is certified that error appears in the above-identified patent and that said Letters Patent is hereby corrected as shown below:

Col. 2, line 34, change "surfaces" to --surface--.

Col. 3, line 62, change "pump" to --sump--.

Col. 6, line 53, change "perspec" to --respec--.

Cl. 4, Col. 10, line 18, change "the" second occurrence, to --then--.

Signed and Sealed this

*Sixteenth* Day of *April 1985*

[SEAL]

*Attest:*

DONALD J. QUIGG

*Attesting Officer* *Acting Commissioner of Patents and Trademarks*